United States Patent
Qian et al.

(10) Patent No.: US 9,424,293 B2
(45) Date of Patent: Aug. 23, 2016

(54) ROW, TABLE, AND INDEX COMPRESSION

(71) Applicant: SYBASE, INC., Dublin, CA (US)

(72) Inventors: Xu-dong Qian, Shanghai (CN); Leon Xiong, Shanghai (CN)

(73) Assignee: Sybase, Inc., Dublin, CA (US)

( * ) Notice: Subject to any disclaimer, the term of this patent is extended or adjusted under 35 U.S.C. 154(b) by 142 days.

(21) Appl. No.: 14/213,088

(22) Filed: Mar. 14, 2014

(65) Prior Publication Data
US 2015/0261823 A1 Sep. 17, 2015

(51) Int. Cl.
*G06F 17/30* (2006.01)

(52) U.S. Cl.
CPC .............................. *G06F 17/30312* (2013.01)

(58) Field of Classification Search
None
See application file for complete search history.

(56) References Cited

U.S. PATENT DOCUMENTS

| | | | | |
|---|---|---|---|---|
| 5,973,626 A | * | 10/1999 | Berger | H03M 7/42 341/106 |
| 7,103,608 B1 | * | 9/2006 | Ozbutun | G06F 17/30492 707/604 |
| 2015/0199393 A1 | * | 7/2015 | Friske | G06F 17/30292 707/803 |

* cited by examiner

*Primary Examiner* — Hung Q Pham
(74) *Attorney, Agent, or Firm* — Schwegman Lundberg & Woessner, P.A.

(57) ABSTRACT

Methods, systems, and computer program products for compressing a row are described. A common prefix may be obtained and data in the row matching the common prefix may be identified. A column number of a column corresponding to a breakpoint of the common prefix may be determined and data matching the common prefix may be deleted from the row. An identifier of the common prefix may be inserted into the row and a breakpoint field in the row may be set to the determined column number.

20 Claims, 9 Drawing Sheets

ROW, TABLE, AND INDEX COMPRESSION

FIELD

The present disclosure relates, generally, to data compression. In an example embodiment, the disclosure relates to compressing rows of a table.

BACKGROUND

Enterprise data is growing rapidly and enterprises are looking for ways to utilize big data to gain a competitive advantage. Databases have traditionally used data compression models to make data easily consumable. In general, the major barrier in data compression is that, as the compression ratio increases, so does the complexity; a higher compression ratio often means that it is more difficult to decompress the data. An optimal compression technique would be one that can provide a high compression ratio, but still not consume excessive computer resources to query the data for analytics.

Many conventional compression algorithms, such as null suppression, Huffman, and the like, may provide 50 to 85% compression rates, but may be complex, and the decompression of data may be a time intensive process. Nonetheless, these techniques may be efficient in reducing the I/O (input/output) overhead and hence may be suitable for I/O bound applications. In contrast, in the case of more lightweight compression techniques such as data dictionary compression, run-length, delta encoding, and the like, the I/O benefits of compression may substantially outweigh the associated processing costs.

Compression techniques have evolved from row-based compression approaches to column-based compression schemes, as column stores have natural redundancy in data values due to a recurrence of data values or patterns. Such techniques make decompression or consumption of data relatively easier. In column stores, a high compression ratio can be achieved compared to traditional row-oriented database systems. This may result in reduced storage needs, improved performance (for I/O intensive applications), and an increase in buffer pool/cache hit rate.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for compressing rows of a table are disclosed. Example tables include a data table, an index table, and the like. In one example embodiment, redundant information in the rows of an index is removed and stored as a separate prefix. In one example embodiment, only index leaf pages are compressed. The leaf page of an index may be the lowest level of the index where the keys for the index may appear in sorted order.

In one example embodiment, an index row may comprise keying data organized in fixed-length columns and variable-length columns. The fixed-length columns and variable-length columns may be grouped together, as described more fully below. In this manner, the index key data may be treated as a single string and prefix entries may be generated based on the string. For example, prefix entries may be generated based on a common string appearing in one index leaf page. The prefix entries may be based on a variety of string types, including text strings, binary strings, character strings, and the like. In one example embodiment, an index leaf row format is defined that positions the columns in the order in which they are defined in the index without non-key data between the columns. If a fixed-length column is positioned after a variable-length column, the fixed-length column may be treated as a variable-length column in the compression technique. For example, although the location of a fixed-length column may be determined by processing the lengths of other fixed-length columns, an offset used to identify a location of variable-length column may be used to identify the location of the fixed-length column.

In one example embodiment, prefix compression may identify index rows that contain identical values for the leading columns of the index key data. The common prefix may be extracted from each matching index row and the extracted elements may be replaced in the index row with an identifier that identifies the prefix entry. For example, the extracted elements may be replaced in the index row with a location of the prefix entry in a prefix table.

In one example embodiment, compression may be triggered based on an availability of storage space. If an amount of available storage space is below a threshold, compression may be triggered. If an existing row is suitable for compression, then the row will be compressed in a page-compressed format. If the row is not suitable for compression, then the row is left in an uncompressed row format. Thus, after page compression, some leaf rows are in page-compressed format and other leaf rows are in the uncompressed row format. In an index table, the lowest level of the index may be a leaf level. At the leaf level, the index can contain one or more leaf rows, which are rows that do not have child rows.

Figure 1A:
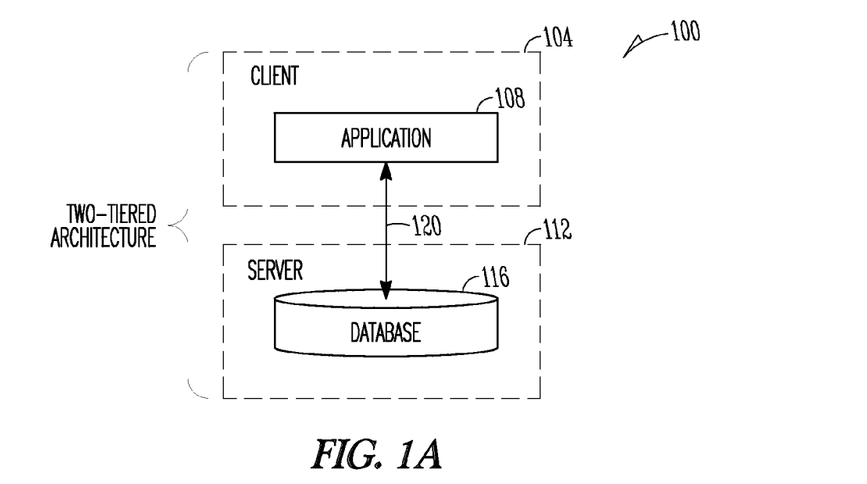
FIGS. 1A and 1B illustrate schematic diagrams of example systems for compressing a row of a table, in accordance with an example embodiment.
Figure 1B:
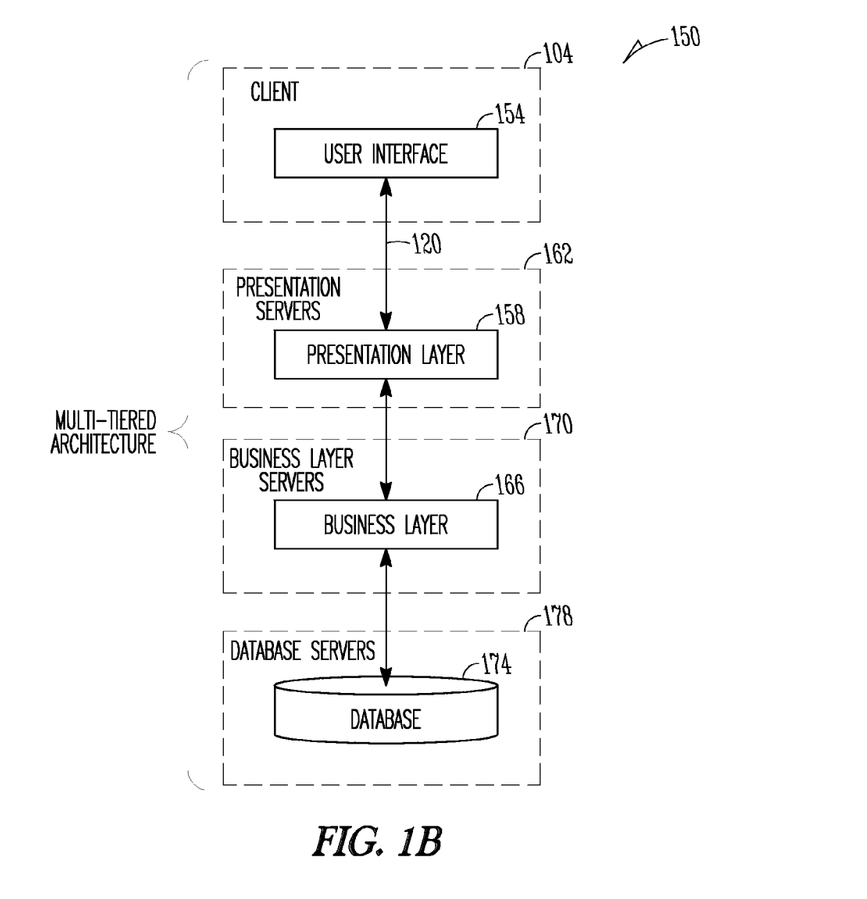

FIGS. 1A and 1B illustrate schematic diagrams of example systems 100, 150 for compressing a row of a table, in accordance with an example embodiment. Traditional client-server systems may employ a two-tiered architecture such as that illustrated by system 100 in FIG. 1A. Application 108 executed on the client 104 of the two-tiered architecture may be comprised of a monolithic set of program code including a graphical user interface component, presentation logic, business logic and a network interface that enables the client 104 to communicate over a network 120 with one or more servers 112. A database 116 may be maintained on the server 112 that provides non-volatile or "persistent" storage for the data accessed and/or processed by the application 108.

The "business logic" component of the application 108 may represent the core program code of the application 108, i.e., the rules governing the underlying business process (or other functionality) provided by the application 108. The "presentation logic" may describe the specific manner in which the results of the business logic are formatted for display on the user interface. The "database" 116 may include data access logic used by the business logic to store and retrieve data.

In response to limitations associated with the two-tiered client-server architecture, a multi-tiered architecture has been developed, as illustrated in FIG. 1B. In the multi-tiered system 150, the presentation layer 158, business layer 166 and database 174 may be logically separated from the user interface 154 of the application. These layers may be moved off of the client 104 to one or more dedicated servers on the network 120. For example, the presentation layer 158, the business layer 166, and the database 174 may each be maintained on separate servers (e.g., presentation servers 162, business layer servers 170 and database servers 178).

This separation of logical components and the user interface 154 may provide a more flexible and scalable architecture compared to that provided by the two-tiered model of the system 100 in FIG. 1A. For example, the separation may ensure that all clients 104 share a single implementation of business layer 166. If business rules change, changing the current implementation of business layer 166 to a new version may not call for updating any client-side program code. In addition, the presentation layer 158 may be provided, which generates code for a variety of different user interfaces 154, which may be standard browsers.

Figure 2:
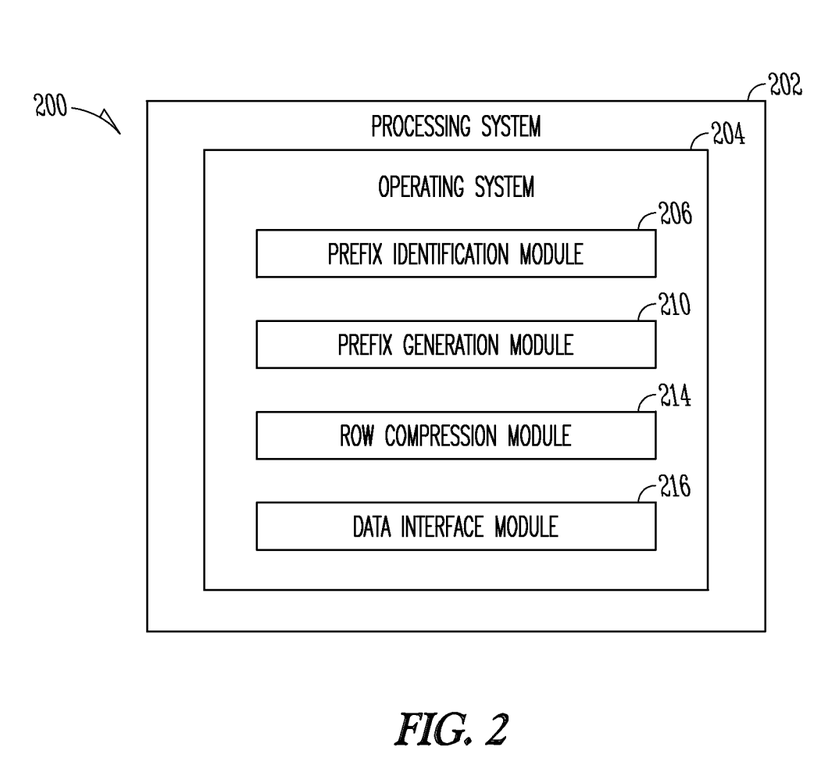
FIG. 2 is a block diagram of an example apparatus for compressing rows of a table, in accordance with an example embodiment.

FIG. 2 is a block diagram of an example apparatus 200 for compressing rows of a table, in accordance with an example embodiment. For example, the apparatus 200 may be used to generate prefix entries and the compressed rows.

The apparatus 200 is shown to include a processing system 202 that may be implemented on a server 112, client 104, or other processing device that includes an operating system 204 for executing software instructions. In accordance with an example embodiment, the apparatus 200 may include a prefix identification module 206, a prefix generation module 210, and a row compression module 214. In accordance with an example embodiment, the apparatus 200 may include a data interface module 216.

The prefix identification module 206 may obtain a selected row and compare the column data of the selected row to the column data of one or more other rows. The prefix identification module 206 may identify a prefix that is common to the column data of the selected row and the one or more other rows.

The prefix generation module 210 may obtain a prefix for a selected row and may replace column data with an identifier of the prefix. The prefix generation module 210 may also update offsets that identify a location of column data in a row, as described more fully below in conjunction with FIG. 8.

The row compression module 214 may obtain a selected row and a prefix for the selected row, and may generate a compressed row comprising a prefix breakpoint, a prefix identifier, and updated offsets, as described more fully below in conjunction with FIG. 8.

Figure 3:
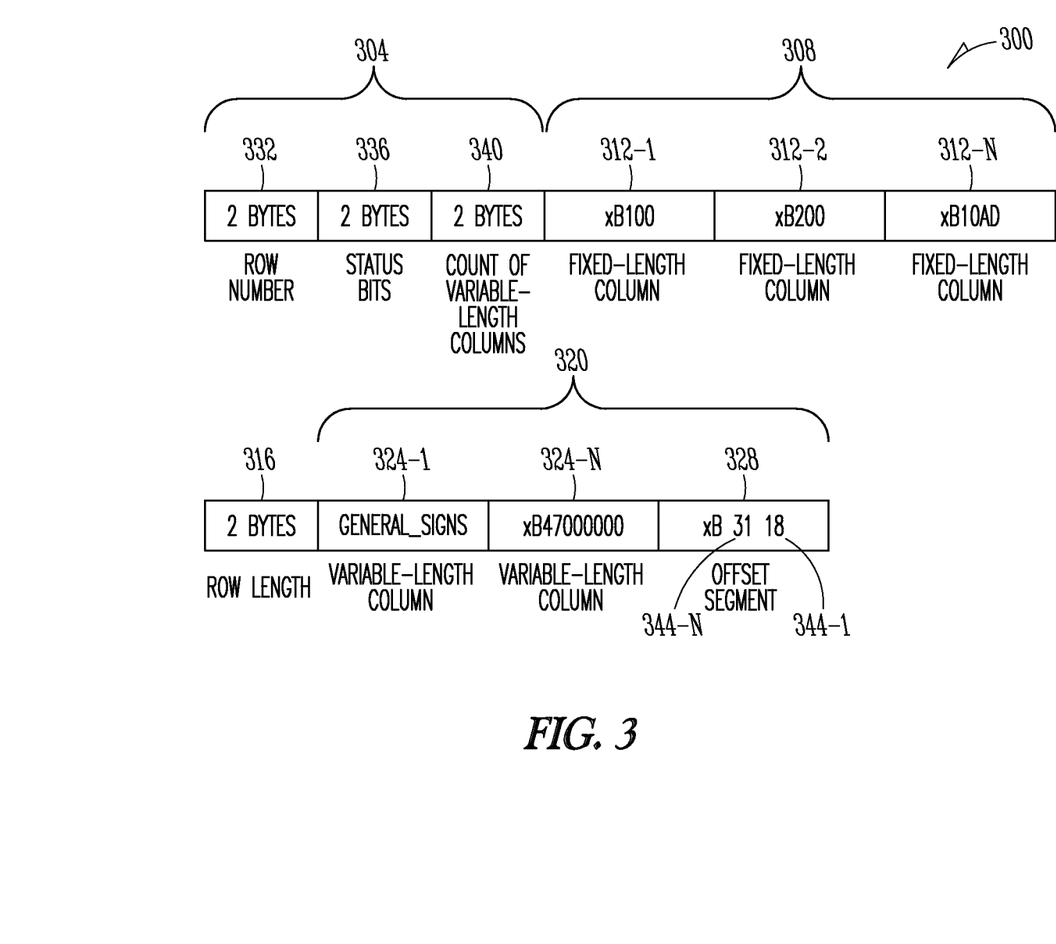
FIG. 3 illustrates the structure of an example row of a data table, in accordance with an example embodiment.

FIG. 3 illustrates the structure of an example row 300 of a data table, in accordance with an example embodiment. The row 300 may comprise a header 304, a fixed-length column segment 308 comprising one or more fixed-length columns 312-1, . . . , 312-N (hereinafter fixed-length columns 312), a row length field 316, and a variable-length column segment 320 comprising one or more variable length columns 324-1, . . . , 324-N (hereinafter variable-length columns 324) and an offset segment 328.

The header 304 may comprise a row number 332, a status 336, and a count of variable-length columns 340. The row number 332 may comprise, for example, two bytes and may indicate the number of the row in the page in which the row 300 is stored. The status 336 may comprise, for example, two bytes and may indicate, for example, the structure of the row 300. The count of variable-length columns 340 may comprise, for example, two bytes and may indicate a count of the variable-length columns 324 that are represented in the variable-length column segment 320.

The fixed-length column segment 308 may comprise data for one or more fixed-length columns 312. For example, column 312-1 may contain the number of employees of each customer and may be an integer represented with three bytes. A customer identification column 312-2 may contain an identification number for each customer and may be an integer represented with three bytes. A customer department column 312-N may contain a customer department identifier for each customer and may be a character string represented with four bytes.

The row length field 316 may comprise, for example, two bytes and may indicate the total count of bytes in the row 300.

The variable-length column segment 320 may comprise data for the variable-length columns 324 and the offset segment 328. For example, a first variable-length column 324-1 may be a customer name column 324-1 and may contain the name of each customer. A second variable-length column 324-N may be a customer revenue column 324-N and may comprise an integer representing the revenue of each customer, where the integer is represented by a variable number of bytes.

The offset segment 328 may comprise an offset 344-1, . . . , 344-N (hereinafter offsets 344) for each variable-length column 324. Each offset 344 may be, for example, two bytes. Each offset 344 may indicate the byte offset of the start of the corresponding variable-length column 324 from the beginning of the row 300. For example, if the start of the customer revenue column 324-N is the thirty-second byte in the row 300, the offset 344 may be 31. The offset 344 may therefore be used to locate the data of a variable-length column 324 in the variable length column segment 320. As illustrated in FIG. 3, the offsets 344 may be listed in a reverse order, as described more fully below.

Figure 4A:
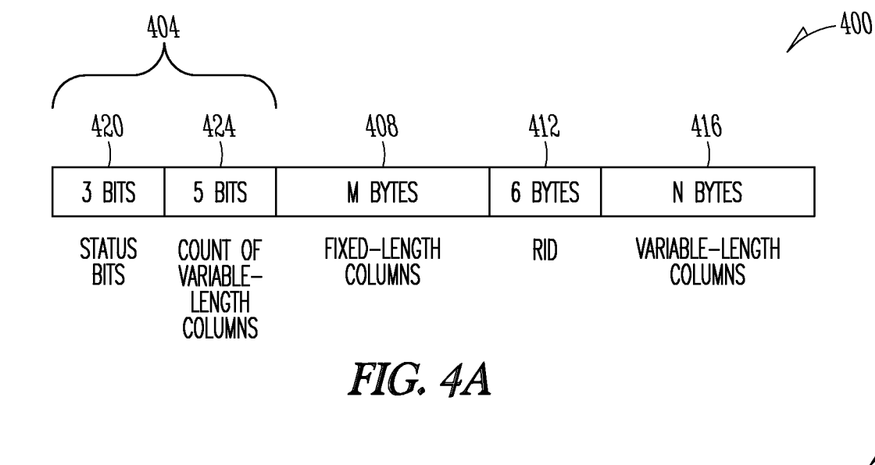
FIG. 4A illustrates the structure of an example non-duplicate leaf row of an index table, in accordance with an example embodiment.

FIG. 4A illustrates the structure of an example non-duplicate leaf row 400 of an index table, in accordance with an example embodiment. A non-duplicate leaf row 400 is a leaf row that corresponds to a single row 300 in a data table. The non-duplicate leaf row 400 may comprise a header 404, a fixed-length column segment 408 for one or more fixed length columns, a row identifier 412, and a variable-length column segment 416 for one or more variable-length columns.

The header 404 may comprise a status 420 and a count of variable-length columns 424. The status 420 may indicate the type of leaf row 400. For example, the status 420 may indicate that the row 400, 450 has the structure of FIG. 4A or the structure of FIG. 4B, as described more fully below. The count of variable-length columns 424 may comprise, for example, five bits and may indicate a count of the variable-length columns that are comprised in the variable-length column segment 416.

The fixed-length column segment 408 may comprise data for one or more fixed-length columns. For example, a customer name column may contain the name of each customer and may be a fixed length of 20 characters. A customer identification column may contain an identification number for each customer and may be an integer represented with four bytes.

The row identifier 412 may comprise six bytes and may identify a location of the row 300 that corresponds to the non-duplicate leaf row 400.

The variable-length column segment 416 may comprise one or more variable-length columns, as described more fully below. Each variable-length column may comprise a column length byte count and column data. For example, a customer address column may contain the address of each customer; the first two bytes may indicate the number of bytes in the customer address and the next set of bytes may contain the customer address data. A customer revenue column may comprise an integer representing the customer revenue; the first two bytes may indicate the number of bytes used to represent the integer and the next set of bytes may contain the integer. In one example embodiment, the first two bytes of a variable-length column represent the count of bytes in the column data if the value of the two bytes is less than 253, the first two bytes of a variable-length column indicates that the following two bytes represent the count of bytes in the column data if the value of the two bytes equals 253, and the first two bytes of a variable-length column indicate that the corresponding column is a null column if the value of the two bytes equals 255.

Figure 4B:
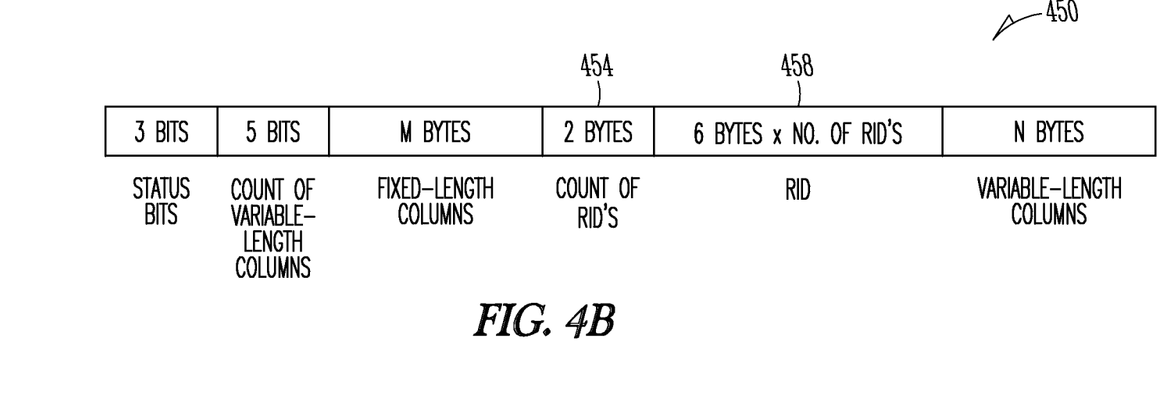
FIG. 4B illustrates the structure of an example duplicate leaf row of an index table, in accordance with an example embodiment.

FIG. 4B illustrates the structure of an example duplicate leaf row 450 of an index table, in accordance with an example embodiment. A duplicate leaf row 450 is a leaf row that corresponds to a plurality of rows 300 in a data table. The duplicate leaf row 450 is similar in structure to the non-duplicate leaf row 400; however, the duplicate leaf row 450 comprises a row identifier (RID) count field 454 and an RID data segment 458 that comprises a plurality of row identifiers 412. The RID count field 454 comprises, for example, two bytes and may provide a count of the number of row identifiers 412 in the RID data segment 458 (and therefore a count of the rows 300 that correspond to the duplicate leaf row 450). The RID data segment 458 may comprise a plurality of row identifiers 412 where each row identifier 412 identifies the location of a row 300 that corresponds to the duplicate leaf row 450. Each row identifier 412 may be, for example, six bytes in length.

In one example embodiment, to introduce prefix compression for an index leaf row 400, 450, a length indicator should not reside between the data portions that are to be extracted for the prefix. For example, a length byte count should not be interleaved with variable-length column data in the variable-length column segment 416. Instead, the data portions that are to be extracted for the prefix should be grouped together without non-column data between them, such as length data. Therefore, for variable-length columns, an offset technique, such as the offset technique of the row 300, should be used rather than the column length technique in the variable-length column segment 416 of row 400, 450.

Figure 5A:
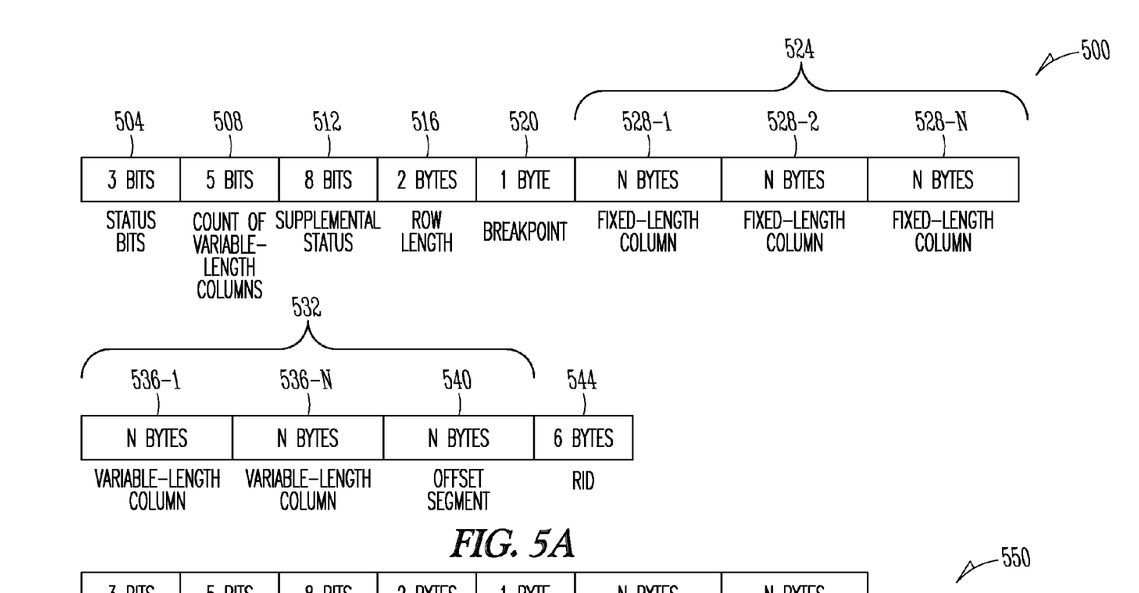
FIG. 5A illustrates an alternative structure of an example non-duplicate leaf row of an index table, in accordance with an example embodiment.

FIG. 5A illustrates an alternative structure of an example non-duplicate leaf row 500 of an index table, in accordance with an example embodiment. The non-duplicate leaf row 500 may comprise a status 504, a count of variable-length columns 508, a supplemental status 512, a row length field 516, a breakpoint field 520, a fixed-length column segment 524 comprising one or more fixed-length columns 528-1, . . . 528-N (hereinafter fixed-length columns 528), a variable-length column segment 532 comprising one or more variable-length columns 536-1, . . . 536-N (hereinafter variable-length columns 536), and a row identifier 544. The supplemental status 512 may be reserved for future use, such as indicating that the row identifier(s) 544 are compressed. The row length field 516 may comprise, for example, two bytes and may indicate the total count of bytes in the row 500 (excluding row identifier 544). The row length field 516 may be used, for example, to locate the starting point of the row identifier 544 and the ending point of the offset segment 540.

The breakpoint field 520, as described more fully below in conjunction with FIG. 6, indicates a location of the end of the data segment to be used in a prefix entry. In one example embodiment, the breakpoint field 520 comprises the ordinal number of the column where the prefix ends. For example, if the prefix includes the first four columns or includes the first three columns plus a portion of the fourth column of the variable-length column segment 532, then the breakpoint field 520 would be four, thus indicating that the breakpoint of the prefix is the fourth column of the variable-length column segment 532.

The status 504 may indicate the type of the row 500. For example, the status 504 may indicate that the row has the structure of FIG. 5A or the structure of FIG. 5B, as described more fully below.

The count of variable-length columns 508 may comprise, for example, five bits and may indicate a count of the variable-length columns 536 that are included in the variable-length column segment 532.

The fixed-length column segment 524 may comprise data for one or more fixed-length columns 528. For example, a customer name column 528-1 may contain the name of each customer and may be a fixed length of 20 characters. A customer identification column 528-2 may contain an identification number for each customer and may be an integer represented with four bytes.

The variable-length column segment 532 may comprise one or more variable-length columns 536 and an offset segment 540. The variable-length column segment 532 may comprise the data for each of the one or more variable-length columns 536. For example, a first variable-length column 536-1 may be a customer name column that may contain the name of each customer and may comprise a variable number of bytes. A customer revenue column 536-N may comprise an integer representing the revenue of each customer, where the integer is represented by a variable number of bytes. The offset segment 540 may comprise an offset 344 for each variable-length column 536. Each offset 344 may comprise, for example, two bytes. The offset 344 may indicate the byte offset of the start of the data column from the beginning of the non-duplicate leaf row 500. For example, if the start of the revenue column 536-N is the seventeenth byte in the non-duplicate leaf row 500, the offset 344 may be 16. The offset 344 may therefore be used to locate the data of a variable-length column 536 in the variable-length column segment 532. In one example embodiment, the order of the offsets 344 in the offset segment 540 is reversed, i.e., the offset 344 corresponding to the first variable length column 536 is the last offset 344 in the offset segment 540. The reverse order convention for the offset segment 540 will be followed in the examples below.

The row identifier 544 may comprise, for example, six bytes and may identify a location of row 300 that corresponds to the non-duplicate leaf row 500.

Figure 5B:
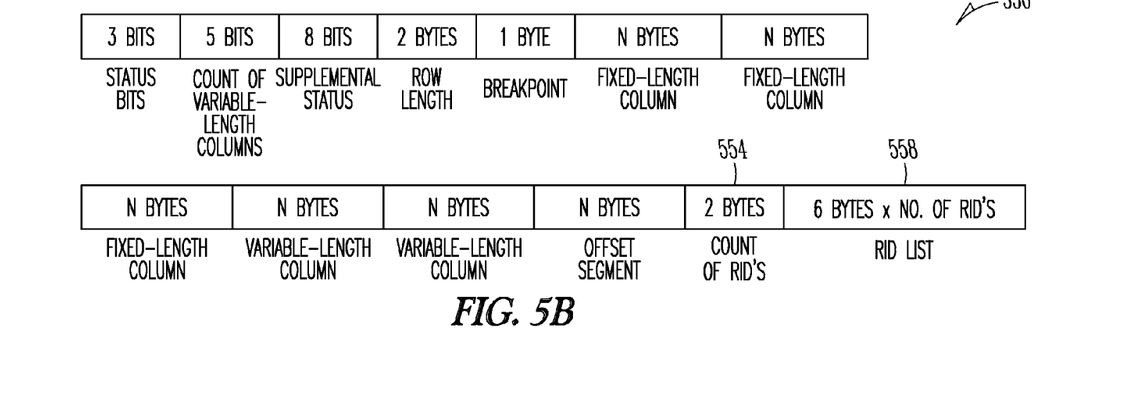
FIG. 5B illustrates an alternate structure of an example duplicate leaf row of an index table, in accordance with an example embodiment.

FIG. 5B illustrates an alternate structure of an example duplicate leaf row 550 of an index table, in accordance with an example embodiment. The duplicate leaf row 550 is similar in structure to the non-duplicate leaf row 500; however, the duplicate leaf row 550 comprises an RID count field 554 and an RID data segment 558 that comprises a plurality of row identifiers 544. The RID count field 554 comprises, for example, two bytes and may provide a count of the number of row identifiers 544 in the RID data segment 558 (and therefore a count of the rows 300 that correspond to the duplicate leaf row 550). The row identifier data segment 558 may comprise a plurality of row identifiers 544 that identify the locations of rows 300 that correspond to the duplicate leaf row 550. Each row identifier 544 may be, for example, six bytes in length.

In one example embodiment, in order to save storage space, a one-byte offset entry for each variable-length column 536 is used if the last variable-length column 536's offset 344 is less than 256; otherwise, a two-byte offset entry for each variable-length column 536 is used. The number of bytes used for the offset 344 may be indicated by a bit in the supplemental status 512.

Figure 6:
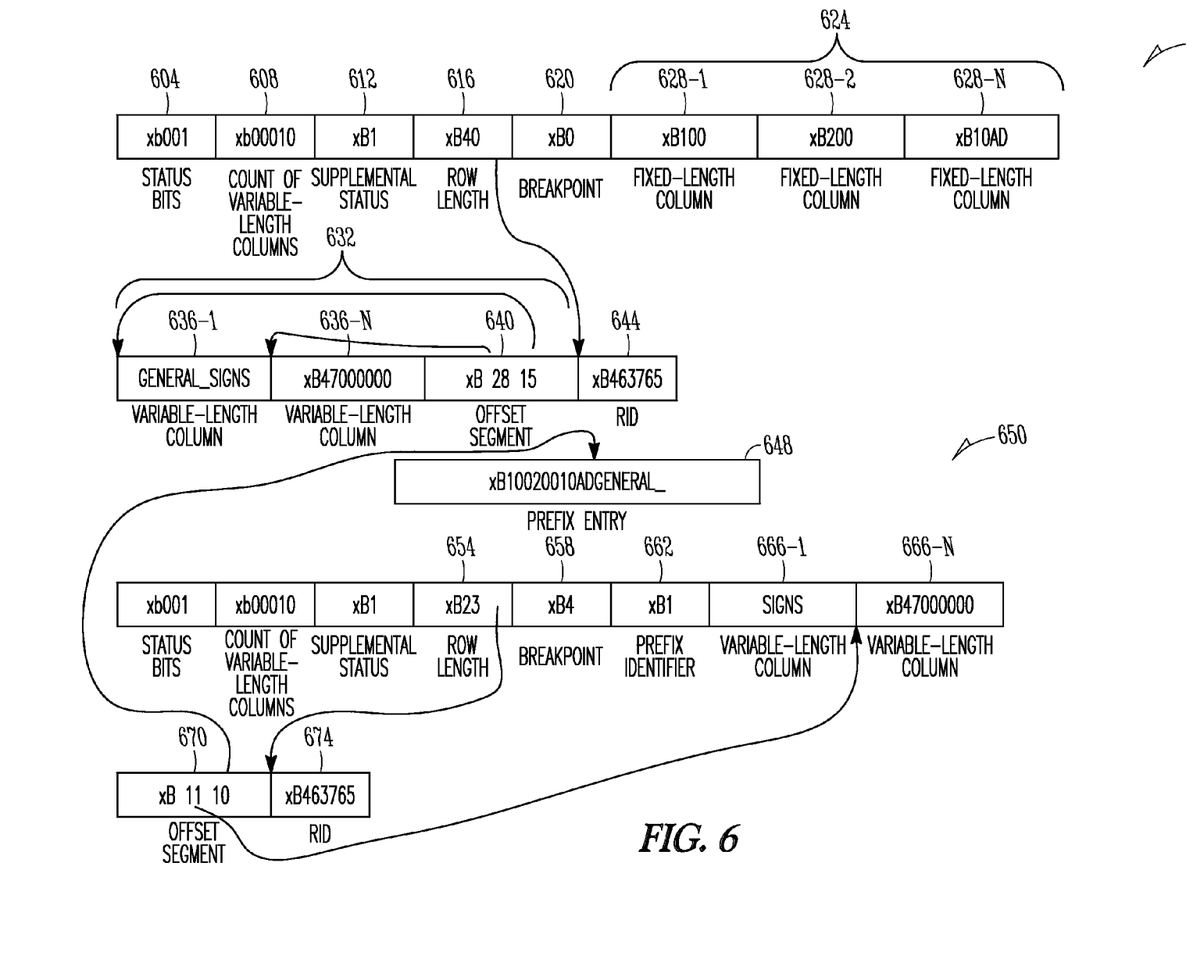
FIG. 6 illustrates a first example of a non-duplicate leaf index row of an index table using the alternative structure of FIG. 5A, in accordance with an example embodiment.

FIG. 6 illustrates a first example of a non-duplicate leaf index row 500 of an index table using the alternative structure of FIG. 5A, in accordance with an example embodiment. In the example of FIG. 6, the status 604 indicates that the alternative structure 500 of FIG. 5A is used, the count of variable-length columns 608 indicates that the row 600 includes two variable-length columns, the supplemental status 612 indicates that each offset 344 has two bytes and indicates that the row is compressed, and the row length field 616 indicates that the row 600 (excluding the row identifier 644) is 40 bytes in length. The breakpoint field 620 initially contains a null symbol indicating that the row 600 is currently uncompressed. The fixed-length column segment 624 comprises the three fixed-length columns (where the data of fixed-length column 628-1 is 100, the data of fixed-length column 628-2 is 200, and the data of fixed-length column 628-N is LOAD), the variable-length column segment 632 comprises two variable-length data segments (where the data of variable-length column 636-1 is General_Signs and the data of variable-length column 636-N is 47,000,000), the offset segment 540 comprises two offsets 344 (i.e., 15 and 28), and the row identifier 544 is 463765. In the present example, a plurality of rows of the index table contain the same data as in row 600 in the three fixed-length columns 628 and the first eight bytes of the first variable-length column 636-1.

A compression prefix entry 648 may be generated based on the data contained in the three fixed-length columns 628 and the first eight bytes of the first variable-length column 636-1. The data contained in the three fixed-length columns 628 and the first eight bytes of the first variable-length column 636-1 may be removed from the example row 600 and may be replaced with a prefix identifier 662 that identifies the corresponding prefix entry 648. In the present example, the prefix identifier 662 is set to 01, the identifier of the cited prefix entry 648, and the breakpoint field 620 is set to four to indicate that the fourth column is broken by prefix compression.

Since data has been removed from the row 600, the offsets 344 in the offset segment 670 may be recomputed. The offset 344 for a variable-length column that completely resides in the prefix entry 648 is computed as the prefix offset of the column in the prefix entry 648. Similarly, the offset 344 for a variable-length column that partially resides in the prefix entry 648 is computed as the offset 344 of the column in the prefix entry 648. The offset 344 for a variable-length column that completely resides in the compressed row 650 is computed as the offset 344 of the column in the compressed row 650. Thus, the offset 344 for variable-length column 636-1 is set to ten since the cited column is preceded by ten bytes in the prefix entry 648 and the offset 344 for variable-length column 636-N is set to eleven since the cited column is preceded by twelve bytes in the compressed row 650.

In the example of FIG. 6, the prefix compression spans the datum of fixed-length columns 628-1, 628-2, and 628-N, and a prefix portion of the variable-length column 636-1. The breakpoint field 620 will therefore be set to 4, which is the fourth column in the order of key columns in the index definition, as illustrated in breakpoint field 658 of compressed row 650. Also, as illustrated in compressed row 650, fixed-length columns 628 and the portion of variable-length column 636-1 encompassed by the prefix entry 648 have been replaced by the prefix identifier 662 (which is set to one), as illustrated in FIG. 6. The variable-length column 666-N is unchanged and the data of variable-length column 666-1 has been replaced by the character: "SIGNS." The row length field 654 has been updated to indicate that the total count of bytes in the row 600 (excluding row identifier 674) is 23.

Figure 7:
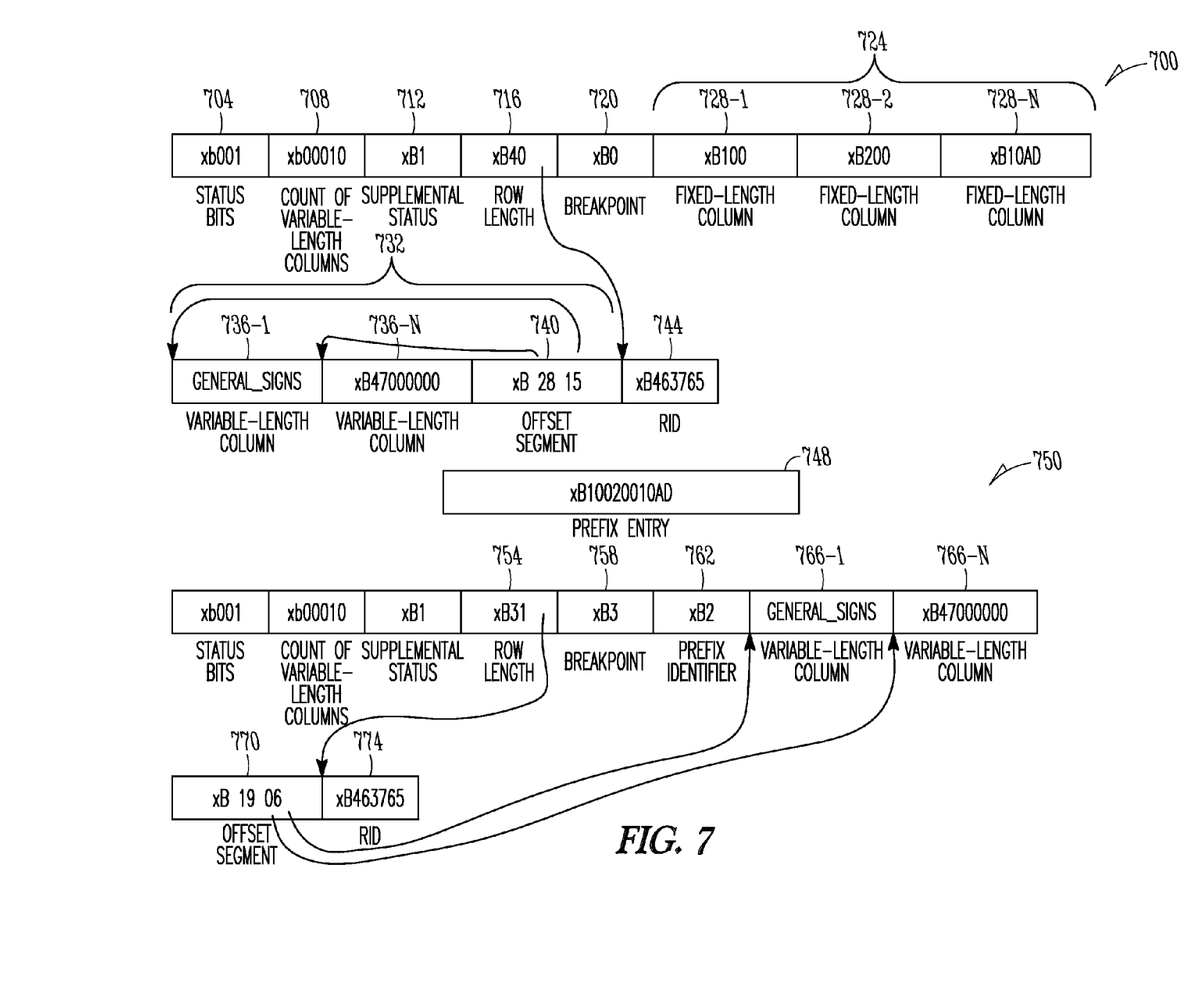
FIG. 7 illustrates a second example of a non-duplicate leaf index row of an index table using the alternative structure of FIG. 5A, in accordance with an example embodiment.

FIG. 7 illustrates a second example of a non-duplicate leaf index row 500 of an index table using the alternative structure of FIG. 5A, in accordance with an example embodiment. In the example of FIG. 7, the row 700 is identical to the row 600 of FIG. 6; however, a plurality of rows of the index table contain the same data as only the three fixed-length columns 728 of row 700.

A compression prefix 748 may be generated based on the data contained in the three fixed-length columns 728. The data contained in the three fixed-length columns 728 may be removed from the example row 700 and may be replaced with a prefix identifier 762 that identifies the corresponding prefix entry 748. In the present example, the prefix identifier 762 is set to 02, the identifier of the cited prefix entry 748, and the breakpoint field 720 is set to three to indicate that the prefix compression is broken by the third column.

Since data has been removed from the row 700, the offsets 344 in the offset segment 770 may be recomputed, as described above. In the example of FIG. 7, the prefix compression spans the datum of fixed-length columns 728-1, . . . 728-N (hereinafter fixed-length columns 728). The breakpoint field 720 will therefore be set to three, which identifies the third column in the order of key columns in the index definition, as illustrated in breakpoint field 758 of the compressed non-duplicate leaf index row 750. Also, as illustrated in compressed non-duplicate leaf index row 750, the fixed-length columns 728 have been replaced by the prefix identifier 762 (which is set to two). The variable-length column 766-1 and 766-N are unchanged. The row length field 754 has been updated to indicate that the total count of bytes in the row 700 (excluding row identifier 774) is 31.

Returning to FIG. 6, in the example of compressed row 650, if the first column's datum is to be accessed, it may simply be accessed in the prefix entry 648 identified by the prefix identifier 662 of the compressed row 650. If the fifth column's datum is to be accessed, it may simply be accessed in the compressed row 650. If the fourth column's datum is to be accessed, the fourth column may be accessed in the prefix entry 648 and the compressed row 650, and decompressed. For any compressed row 650, at most one column may need to be decompressed; the other columns are stored either in the prefix entry 648 or stored in the compressed row 650. In addition, if the breakpoint 620 falls at the end of a column, then no columns will need to be decompressed since each column resides in either the prefix entry 648 or the compressed row 650.

In general, if the breakpoint 620 is in the variable-length column segment 632, then all fixed-length columns 628 may be accessed in the prefix entry 648. If the breakpoint 620 is in the fixed-length column segment 624, then at least a portion of a fixed-length column 628 and/or at least one complete fixed-length column 628 has been prefix compressed. Thus, the prefix entry 648 may need to be accessed to obtain a fixed-length column 628. For example, the prefix entry 648 may be accessed to obtain at least a portion of fixed-length column 628-1.

If a column is in the fixed-length column segment 624 and resides before the breakpoint 620, then the column will be located in the prefix entry 648 and may be accessed based on the length(s) of the fixed-length columns preceding the cited fixed-length column 628 in the prefix entry 648.

If a column is in the fixed-length column segment 624 and spans a breakpoint 620, then some part of the column may be in the prefix entry 648 and some part of the column may be in the compressed row 650. The beginning portion of the column 624 may reside in the prefix entry 648 and may be accessed at the beginning of the prefix entry 648. The ending portion of the column may be located at the beginning of the fixed-length column segment 624 in the compressed row 650 and may be accessed based on the predefined count of bytes preceding the fixed-length column 628 in the compressed row 650. The length of the portion of the column located at the beginning of the fixed-length column segment 624 in the compressed row 650 may be determined by accessing the offset 344 of the next column in the compressed row 650, which identifies the location of the beginning of the next column and therefore provides an indication of the end of the fixed-length column 628.

If a column is in the fixed-length column segment 624 and is located after a breakpoint 620, it resides in the compressed row 650 and may be accessed based on the length(s) of the columns preceding the cited fixed-length column 628 in the compressed row 650.

If a column is in the variable-length column segment 632 and resides before the breakpoint 620, then the column may be located in the prefix entry 648 using the corresponding offset 344 of the offset segment 670.

If a column is in the variable-length column segment 632 and spans a breakpoint 620, then some part of the column may be in the prefix entry 648 and some part of the column may be in the compressed row 650. The beginning portion of the column may be located in the prefix entry 648 using the corresponding offset 344 of the offset segment 670. The length of the portion in the prefix entry 648 may be determined by subtracting the offset value from the prefix entry length. The ending portion of the column may be located at the beginning of the variable-length column segment 632 in the compressed row 650 and may be accessed based on the predefined count of bytes preceding the cited variable-length column 636 in the compressed row 650. The length of the portion of the column located at the beginning of the column segment in the compressed row 650 may be determined by accessing the offset 344 of the next column in the compressed row 650, which identifies the location of the beginning of the next column and therefore provides an indication of the end of the variable-length column 636.

If a column is in the variable-length column segment 632 and is located after a breakpoint 620, it resides in the compressed row 650 and can be located using the column's offset 344 of the offset segment 670. The length of the column in the compressed row 650 may be determined by accessing the offset 344 of the next column in the compressed row 650, which identifies the location of the beginning of the next column and therefore provides an indication of the end of the variable-length column 636.

Figure 8:
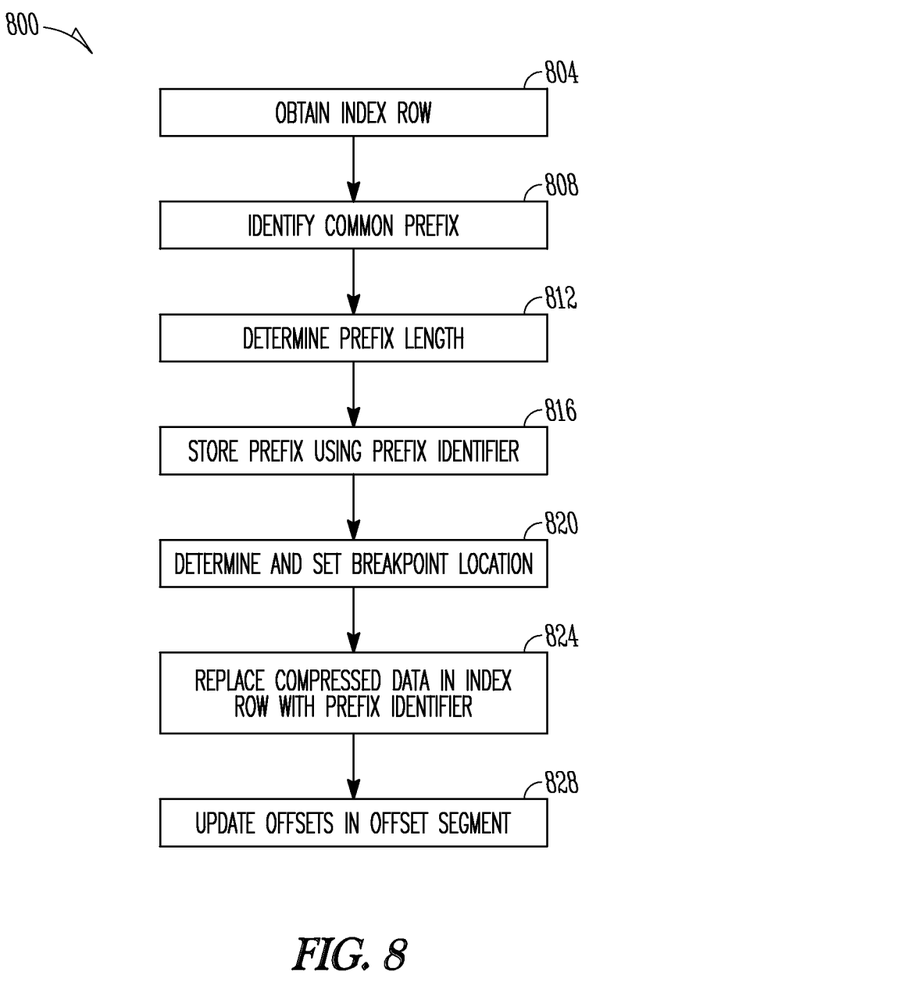
FIG. 8 is a flowchart of an example method for generating a prefix entry and a compressed row, in accordance with an example embodiment.

FIG. 8 is a flowchart of an example method 800 for generating a prefix entry 648 and a compressed row 650, in accordance with an example embodiment. The method 800 may be performed by, for example, the prefix identification module 206 and/or the prefix generation module 210.

In one example embodiment, an index row 600 may be selected and obtained from, for example, an index table (operation 804). The column data of the selected index row 600 may be compared to the column data of one or more other index rows 600 and a common prefix may be identified (operation 808).

The length of the prefix may be determined (operation 812) and the prefix may be stored utilizing a prefix identifier 662 (operation 816). For example, the prefix may be stored in a prefix table where the row number of the prefix entry 648 is the prefix identifier 662.

The prefix length may be used to determine the breakpoint 620 (such as, for example, the count of columns encompassed by the prefix entry 648) (operation 820) and the encompassed data may be replaced with the prefix identifier 662 (operation 824). The offsets 344 of the offset segment 670, 770 may be updated based on the following algorithm (operation 828):

1) If a selected column is completely extracted from a row, the offset 344 is set to a count of bytes of all the columns preceding the selected column in the prefix entry 648;

2) If a selected column is partially extracted from a row, the offset 344 is set to a count of bytes of all the columns preceding the selected column in the prefix entry 648; and 3) If a selected column is not extracted from a row, the offset 344 is set to a count of bytes preceding the selected column in the index row 600.

The method 800 may then end.

Figure 9:
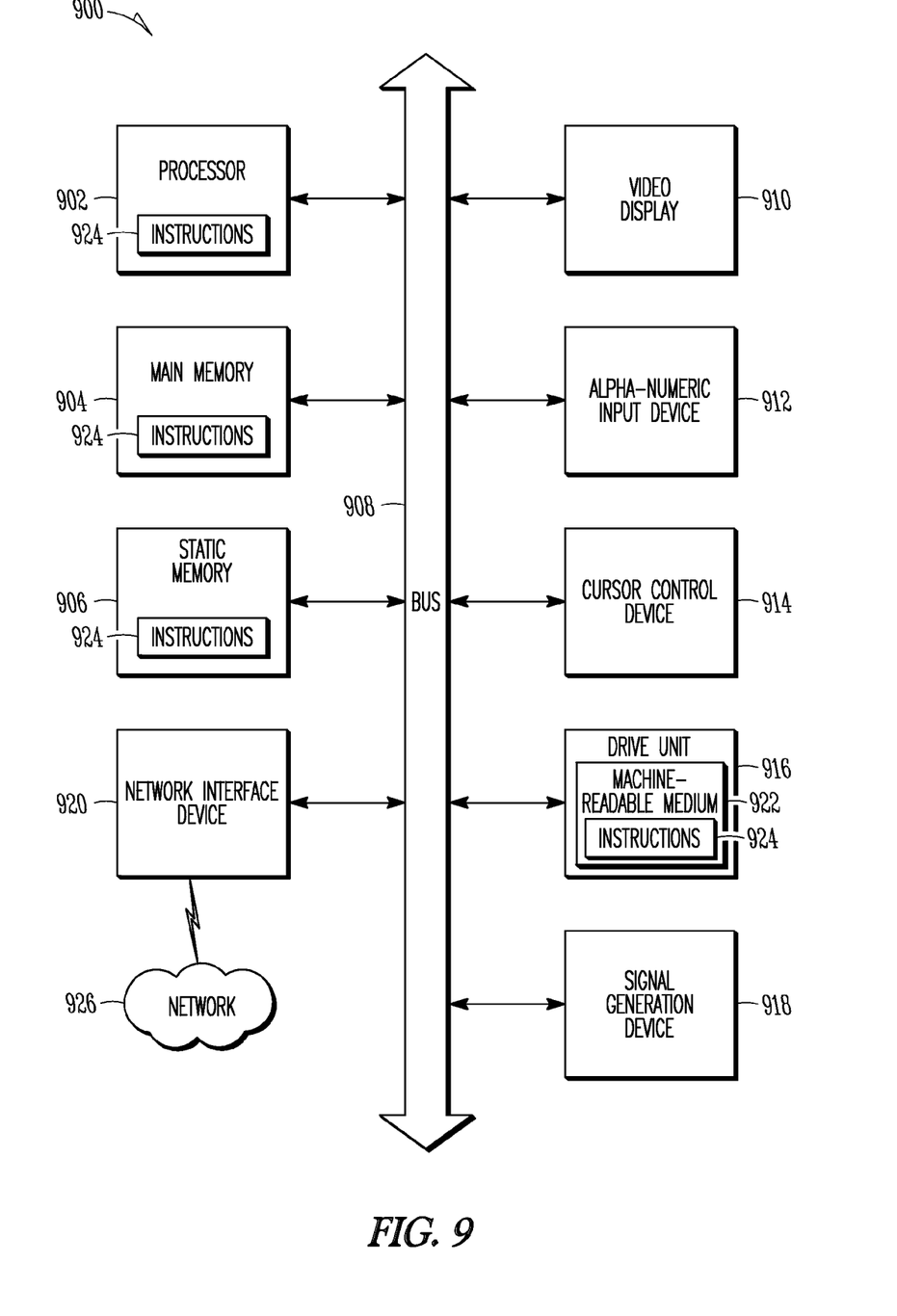
FIG. 9 is a block diagram of a computer processing system within which a set of instructions, for causing the computer to perform any one or more of the methodologies discussed herein, may be executed.

FIG. 9 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed as a software-as-a-service (SaaS) or by an application service provider (ASP) or utility computing providers. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 900 includes a processor 902 (e.g., a central processing unit (CPU), a graphics processing unit (GPU) or both), a main memory 904 and static memory 906, which communicate with each other via a bus 908. The computer processing system 900 may further include a video display unit 910 (e.g., a plasma display, a liquid crystal display (LCD) or a cathode ray tube (CRT)). The computer processing system 900 also includes an alphanumeric input device 912 (e.g., a keyboard), a user interface (UI) navigation device 914 (e.g., a mouse, touch screen, or the like), a drive unit 916, a signal generation device 918 (e.g., a speaker), and a network interface device 920.

The drive unit 916 includes machine-readable medium 922 on which is stored one or more sets of instructions 924 and data structures embodying or utilized by any one or more of the methodologies or functions described herein. The instructions 924 may also reside, completely or at least partially, within the main memory 904, static memory 906, and/or within the processor 902 during execution thereof by the computer processing system 900, the main memory 904, static memory 906, and the processor 902 also constituting machine-readable, tangible media 922.

The instructions 924 may further be transmitted or received over network 926 via a network interface device 920 utilizing any one of a number of well-known transfer protocols (e.g., Hypertext Transfer Protocol).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions 924 for execution by the computer and that cause the computer to perform any one or more of the methodologies of the present application, or that is capable of storing, encoding or carrying data structures utilized by or associated with such a set of instructions 924. The term "machine-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for compressing a row, the method comprising:
   obtaining a common prefix;
   identifying data in the row matching the common prefix;
   determining, using at least one hardware processor, an ordinal column number of a column corresponding to a breakpoint of the common prefix, the breakpoint indicating a location of an end of the common prefix in the row;
   setting a breakpoint field in the row to the determined ordinal column number, wherein the breakpoint field indicates the location of the end of the common prefix in the row;
   deleting the identified data from the row; and
   inserting an identifier of the common prefix in the row.

2. The computerized method of claim 1, wherein the identifier of the common prefix replaces the deleted data matching the common prefix.

3. The computerized method of claim I, further comprising updating an offset segment field based on the deletion of the data matching the common prefix.

4. The computerized method of claim 1, wherein an offset corresponding to a column that partially resides in the common prefix is computed as a count of bytes preceding the column in the common prefix.

5. The computerized method of claim 1, wherein an offset corresponding to a column that completely resides in the common prefix is computed as a count of bytes preceding the column in the common prefix.

6. The computerized method of claim 1, wherein an offset corresponding to a column that completely resides in the row after the deletion is computed as a count of bytes preceding the column in the row after the deletion.

7. The computerized method of claim I, further comprising generating the common prefix by comparing a plurality of rows of an index table.

8. An apparatus for compressing a row, the apparatus comprising:
   one or more hardware processors;

memory to store instructions that, when executed by the one or more hardware processors perform operations comprising:

obtain a common prefix;

identify data in the row matching the common prefix;

determine an ordinal column number of a column corresponding to a breakpoint of the common prefix, the breakpoint indicating a location of an end of the common prefix in the row;

set a breakpoint field in the row to the determined ordinal column number, wherein the breakpoint field indicates the location of the end of the common prefix in the row;

delete the identified data from the row; and insert an identifier of the common prefix in the row.

9. The apparatus of claim 8, wherein the identifier of the common prefix replaces the deleted data matching the common prefix.

10. The apparatus of claim 8, wherein the row compression module is configured to update an offset segment field based on the deletion of the data matching the common prefix.

11. The apparatus of claim 8, wherein an offset corresponding to a column that partially resides in the common prefix is computed as a count of bytes preceding the column in the common prefix.

12. The apparatus of claim 8, wherein an offset corresponding to a column that completely resides in the common prefix is computed as a count of bytes preceding the column in the common prefix.

13. The apparatus of claim 8, wherein an offset corresponding to a column that completely resides in the row after the deletion is computed as a count of bytes preceding the column in the row after the deletion.

14. The apparatus of claim 8, further comprising a prefix identification module for comparing a plurality of rows of an index table and a prefix generation module for generating the common prefix.

15. A non-transitory machine-readable storage medium comprising instructions that, when executed by one or more processors of a machine, cause the machine to perform operations comprising:

obtaining a common prefix;

identifying data in a row matching the common prefix;

determining an ordinal column number of a column corresponding to a breakpoint of the common prefix, the breakpoint indicating a location of an end of the common prefix in the row;

setting a breakpoint field in the row to the determined ordinal column number, wherein breakpoint field indicates the location of the end of the common prefix in the row;

deleting the identified data from the row;

inserting an identifier of the common prefix in the row.

16. The non-transitory machine-readable storage medium of claim 15, wherein the identifier of the common prefix replaces the deleted data matching the common prefix.

17. The non-transitory machine-readable storage medium of claim 15, further comprising instructions that cause the machine to perform an operation of updating an offset segment field based on the deletion of the data matching the common prefix.

18. The non-transitory machine-readable storage medium of claim 15, wherein an offset corresponding to a column that partially resides in the common prefix is computed as a count of bytes preceding the column in the common prefix.

19. The non-transitory machine-readable storage medium of claim 15, wherein an offset corresponding to a column that completely resides in the common prefix is computed as a count of bytes preceding the column in the common prefix.

20. The non-transitory machine-readable storage medium of claim 15, wherein an offset corresponding to a column that completely resides in the row after the deletion is computed as a count of bytes preceding the column in the row after the deletion.

* * * * *